United States Patent [19]

Matsuoka

[11] Patent Number: 4,830,416
[45] Date of Patent: May 16, 1989

[54] BUMPER STRUCTURE

[75] Inventor: Toshimitsu Matsuoka, Tokyo, Japan

[73] Assignee: Nissan Motor Co., Ltd., Yokohama, Japan

[21] Appl. No.: 91,111

[22] Filed: Aug. 31, 1987

[30] Foreign Application Priority Data

Sep. 2, 1986 [JP] Japan .......................... 61-133784[U]

[51] Int. Cl.⁴ ............................................. B60R 19/03
[52] U.S. Cl. ..................................... 293/120; 293/155; 293/121; 293/122
[58] Field of Search ......................... 293/102, 107–110, 293/120–122, 133, 134, 136, 135, 142, 155, 154

[56] References Cited

U.S. PATENT DOCUMENTS

| | | | |
|---|---|---|---|
| 2,954,256 | 9/1960 | Barenyi | 293/155 X |
| 3,884,516 | 5/1975 | Gallion et al. | 293/120 |
| 3,926,462 | 12/1975 | Burns et al. | 296/189 X |
| 3,938,841 | 2/1976 | Glance et al. | 293/120 |
| 4,050,689 | 9/1977 | Barton et al. | 293/110 |
| 4,059,301 | 11/1977 | Meyer | 293/126 X |
| 4,167,282 | 9/1979 | Matsuyama | 293/121 X |
| 4,348,042 | 9/1982 | Scrivo | 293/120 |
| 4,350,378 | 9/1982 | Wakamatsu | 293/120 |
| 4,397,490 | 8/1983 | Evans et al. | 293/135 X |
| 4,457,547 | 7/1984 | Sekiyama et al. | 293/110 |
| 4,474,395 | 10/1984 | Harloff et al. | 293/120 |
| 4,482,180 | 11/1984 | Huber et al. | 293/120 |
| 4,652,032 | 3/1987 | Smith | 293/120 |

FOREIGN PATENT DOCUMENTS 59-69045 6/1984 Japan .

Primary Examiner—Douglas C. Butler
Attorney, Agent, or Firm—Foley & Lardner, Schwartz, Jeffery, Schwaab, Mack, Blumenthal & Evans

[57] ABSTRACT

A bumper structure of a type using a bumper facia. The bumper facia is integrally formed with a longitudinally extending sight shielding portion which is raised from an upper wall portion of the bumper facia. The sight shielding portion is arranged and constructed to conceal unsightly parts employed in the bumper structure.

4 Claims, 2 Drawing Sheets

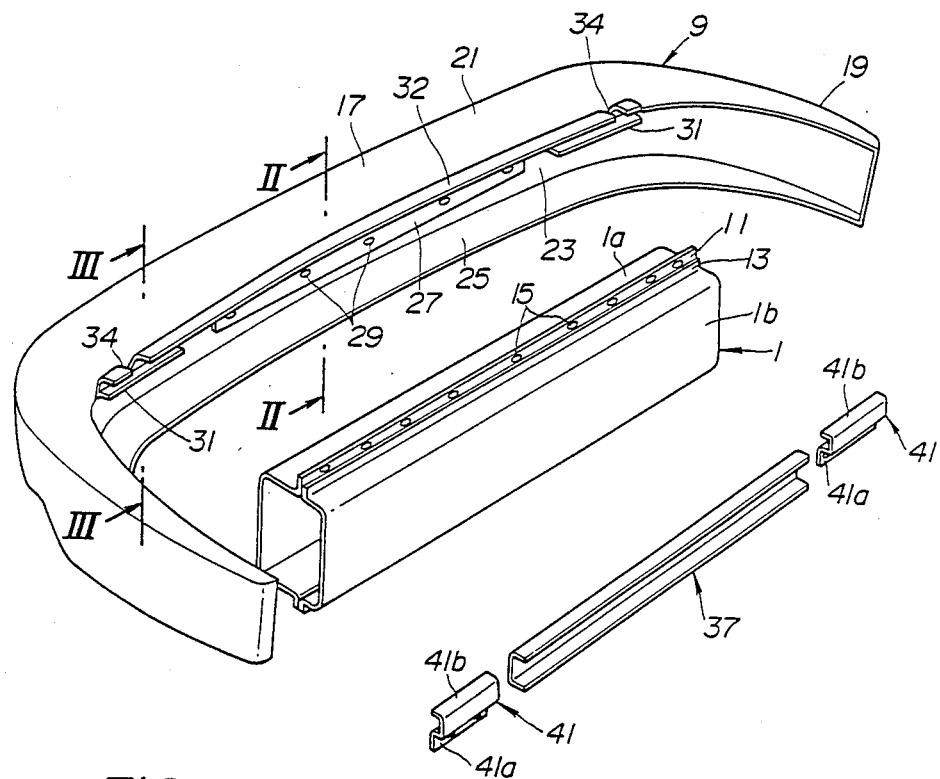
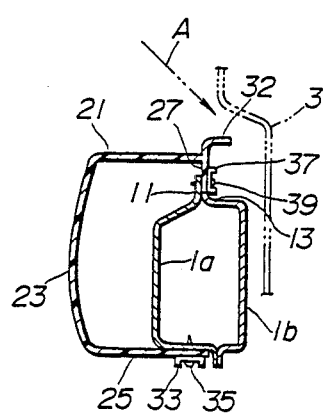
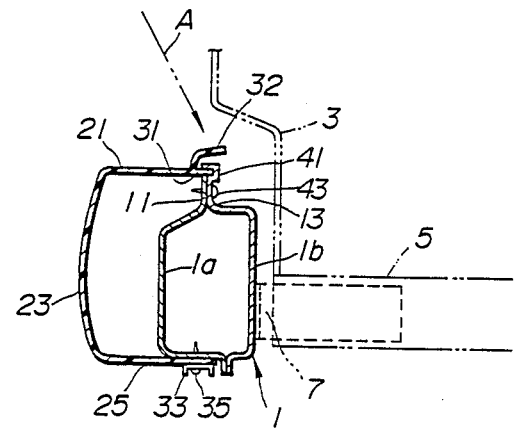

BUMPER STRUCTURE

BACKGROUND OF THE INVENTION

1. Field of the Invention

The present invention relates in general to a bumper structure of a motor vehicle, and more particularly to a bumper structure including a bumper facia.

2. Description of the Prior Art

Some light duty motor vehicles are equipped with bumper structures of a type having a plastic bumper facia. The plastic bumper facia is designed for absorbing a light shock applied to the bumper structure upon a light vehicle collision. Japanese Utility Model First Provisional Publication No. 59-69045 discloses one of the bumper structured of this type, which is shown in FIGS. 4 and 5.

As is seen from these drawings, the conventional bumper structure disclosed in the publication comprises a bumper facia 101 constructed of a plastic channel member having the longitudinal ends rearwardly curved. A horizontal upper wall 103 of the bumper facia 101 is formed at its major portion with longitudinally aligned mounting holes 105. An elongate armature 107 for mounting the bumper facia 101 is secured to suitably reinforced members (not shown) of a vehicle body 117 (see FIG. 5). The armature 107 has at its upper side a longitudinally extending flange 109 with a horizontal surface. The flange 109 has longitudinally aligned mounting holes 111.

As is understood from FIG. 5, upon assembly, the channel-shaped bumper facia 101 partially receives therein the armature 107 having the holes 105 thereof mated with the corresponding holes 111 of the armature 107, and an elongate protecting plate 113 with mounting holes (no numerals) is placed on the upper wall 103 of the bumper facia 101 having the holes thereof mated with the holes 105 of the bumper facia 101. A corresponding number of connecting screws 115 are passed through the mated holes for tightly connecting the bumper facia 101 to the armature 107.

As is seen from FIG. 5, in the conventional bumper structure, an elongate sight shielding member 119 is mounted to the vehicle body 117 at a position above the bumper facia 101. This is made for concealing the unsightly protecting plate and the connecting screws 115 from outside view.

However, usage of such separate sight shield 119 brings about not only an increase in number of parts of the bumper structure but also deterioration of the external view of the vehicle. Furthermore, the provision of such part on the vehicle body increases the steps required for assembling the bumper structure.

SUMMARY OF THE INVENTION

It is therefore an object of the present invention to provide a bumper structure of a type having a bumper facia, which assures its improved external view without usage of such separate sight shielding member.

According to the present invention, there is provided, in a motor vehicle having a vehicle body with a depressed outside portion which extends along a lateral direction of the body, a bumper structure which comprises an elongate armature extending along the depressed outside portion while being partially received in the same, the elongate armature being secured to the vehicle body and including upper and lower portions, a bumper facia consturcted of a channel member which includes upper and lower wall portions and an intermediate wall portion which is interposed between the upper and lower wall portions in a manner to form a channel structure, the bumper facia extending along the elongate armature while partially receiving therein the armature, first connecting means for connecting the upper wall portion of the bumper facia to the upper portion of the elongate armature, second connecting means for connecting the lower wall portion of the bumper facia to the lower portion of the elongate armature, and an elongate sight shielding portion integrally formed on and raised from the upper wall portion of the bumper facia and extending along the longitudinal direction of the upper wall portion, wherein upon assembly of the bumper structure, the elongate sight shielding portion is arranged to conceal the first connecting means from outside view.

BRIEF DESCRIPTION OF THE DRAWINGS

FIG. 1 is an exploded view of a bumper structure of the present invention;

FIG. 2 is a sectional view taken along the line II—II of FIG. 1;

FIG. 3 is a sectional view taken along the line III—III of FIG. 1;

DETAILED DESCRIPTION OF THE INVENTION

Figure 4:
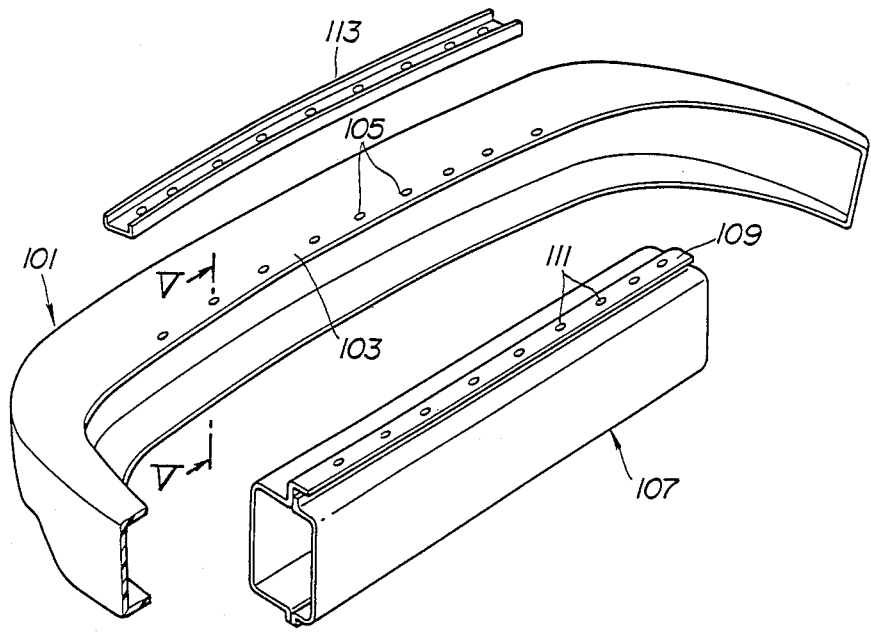
FIG. 4 is a view similar to FIG. 1, but showing a conventional bumper structure.

Referring to FIGS. 1 to 3, there is shown a bumper structure of the present invention.

In the drawings, an elongate armature is denoted by numeral 1, which is constructed of metal and connected through stays 7 to reinforced members 5 of a vehicle body 3. That is, each stay 7 has a bent front end secured to a rear side of the armature 1 and is securely connected or bolted to the associated reinforced member 5, as is understood from FIG. 3. A plastic bumper facia 9 is mounted to the elongate armature 1 in a manner as will be described hereinafter. The armature 1 comprises two, that is, first and second channel-shaped metal members 1a and 1b which are welded at their flanges 11 and 13 to each other so as to form an elongate box. As is seen from FIG. 1, the upper flange 11 of the first metal member 1a is sized larger than the upper flange 13 of the second metal member 1b and is formed with longitudinally aligned mounting holes 15.

The bumper facia 9 is constructed of a plastic channel member having the longitudinal ends rearwardly curved. Polypropylene resin may be used as the material of the bumper facia 9. The bumper facia 9 thus comprises generally a major portion 17 and right and left side portions 19 and 19, each including an upper horizontal wall 21, a vertical wall 23 and a lower horizontal wall 25.

As is seen from FIGS. 1 and 2, the upper horizontal wall 21 at the major portion 17 of the bumper facia 9 is integrally formed at its rear edge with a vertical flange 27 which projects downward toward the lower horizontal wall 25. As is seen from FIG. 1, the vertical flange 27 extends horizontally between a given range of the major portion 17 and is formed with longitudinally aligned mounting holes 29. As is seen from the same drawing, the upper horizontal wall 21 of the major portion 17 is formed at spaced portions of the rear edge thereof with horizontal flanges 31 and 31. Furthermore, the rear edge of the upper horizontal wall 21 is integrally formed with a raised elongate sight shielding portion 32 which extends along the edge and has cuts 34 and 34 near the horizontal flanges 31 and 31.

As is understood from FIG. 2, upon assembly, the lower horizontal wall 25 of the major portion 17 of the bumper facia 9 is connected to a lower side of the first channel member 1a of the armature 1. For this connection, a plurality of connecting screws 35 and an elongate protecting metal member 33 are used. The elongate protecting metal member 33 is attached to the outer surface of the lower horizontal wall 25 of the bumper facia 9, as shown in the drawing. The vertical flange 27 of the bumper facia 9 is sandwiched between the larger upper flange 11 of the armature 1 and another elongate protecting metal plate 37, and a plurality of connecting screws 39 are used for combining these three parts.

As is understood from FIGS. 1 and 3, the spaced horizontal flanges 31 and 31 are supported by respective mounting brackets 41 and 41 which are secured by connecting screws 43 to the larger upper flange 11 of the armature 1. That is, each mounting braket 41 comprises a base portion 41a which is secured to the larger upper flange 11 of the armature 1 and a channel portion 41b which slidably receives therein the associated horizontal flange 31 of the bumper facia 9. As is seen from FIGS. 2 and 3, upon assembly, the raised elongate sight shielding portion 32 is arranged to conceal the unsightly protecting metal member 37 and the connecting screws 39 from outside view, that is, from the view taken from the direction of the arrow "A".

In the following, advantages of the present invention will be described.

Figure 5:
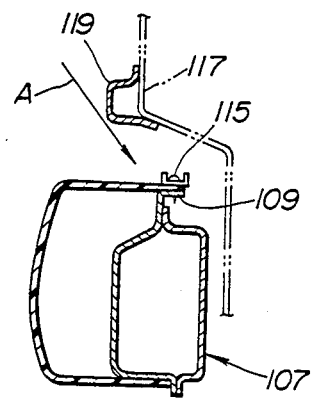
FIG. 5 is a sectional view taken along the line V—V of FIG. 4.

1. Because of the provision of the raised elongate sight shielding portion 32 on the bumper facia 9, there is no need for providing the vehicle body 117 with a separate sight shielding member, such as the shielding member 119 employed in the afore-mentioned conventional bumper structure of FIGS. 4 and 5. Thus, the aforementioned drawbacks originating from the provision of the separate sight shielding member are solved in the invention.

2. Because the horizontal flanges 31 and 31 of the bumper facia 9 are slidably supported by the respective mounting brackets 41 and 41, any elongation or shrinkage of the bumper facia 9 caused by thermal expansion or contraction of the same can be absorbed by the brackets 41 and 41 without applying any stress to the same. This removes or at least minimizes a possibility of making a deformation or breakage of the bumper facia in hot or cold seasons.

What is claimed is:

1. In a motor vehicle having a vehicle body with a depressed outside portion which extends along a lateral direction of the body, a bumper structure which comprises:

an elongate armature extending along the depressed outside portion while being partially received in the same, the elongate armature being secured to the vehicle body and including upper and lower portions;

a bumper facia constructed of a channel member which includes upper and lower wall portions and an intermediate wall portion which is interposed between the upper and lower wall portions so as to form a channel structure, the bumper facia extending along the elongate armature while partially receiving therein the armature;

first connecting means for connecting the upper wall portion of the bumper facia to the upper portion of the elongate armature, said first connecting means including a main flange and a pair of flanges spaced apart by said main flange, said pair of flanges integral with said upper wall portion and projecting toward said depressed outside portion of said vehicle body, and mounting brackets secured to said armature, each mounting bracket including a channel portion in which one of said pair of flanges is slidably received, whereby any elongation or shrinkage of the bumper facia caused by thermal expansion or contraction of the same can be absorbed by the brackets without applying stress to the same;

second connecting means for connecting the lower wall portion of the bumper facia to the lower portion of the elongate armature; and an elongate sight shielding portion integrally formed on and raised from the upper wall portion of the bumper facia and extending along the longitudinal direction of the upper wall portion;

wherein upon assembly of the bumper structure, the elongate sight shielding portion is arranged to conceal the first connecting means from outside view.

2. A bumper structure as claimed in claim 1, in which said first connecting means comprises:

said main flange integral with the upper wall portion of said bumper facia and projecting therefrom toward said lower wall portion of the same;

a second flange integral with said upper portion of said armature and projecting toward said upper wall portion of said bumper facia;

a first protecting metal member attached to said main flange and extending along the same; and a plurality of connecting screws passing through aligned holes formed in said main flange, said second flange and said metal member to combine them.

3. A bumper structure as claimed in claim 2, in which said second connecting means comprises:

a second protecting metal member attached to an outer surface of the lower wall portion of the bumper facia; and a plurality of connecting screws passing through aligned holes formed in the second protecting metal member, said lower wall portion of the bumper facia and the lower portion of said armature.

4. A bumper structure as claimed in claim 3, in which said elongate sight shielding portion is inclined toward said depressed outside portion of the vehicle in order to assure its concealing function.

* * * * *